Figure 1:
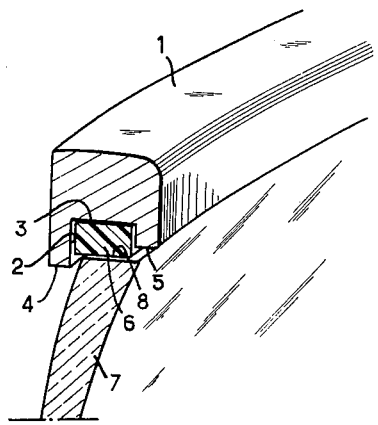

March 29, 1966  G. H. E. LISSAC  3,243,249
OPHTHALMIC LENS MOUNTING WITH RESILIENT STRIP ADHESIVELY BONDED
TO UPPER LENS EDGE AND GROOVED FRONTAL BAR
Original Filed Dec. 4, 1961

INVENTOR:
GEORGES HECTOR EMILE LISSAC
BY: Young & Thompson
ATTORNEYS

3,243,249
OPHTHALMIC LENS MOUNTING WITH RESILIENT STRIP ADHESIVELY BONDED TO UPPER LENS EDGE AND GROOVED FRONTAL BAR

Georges Hector Emile Lissac, 8 Ave. Raphael, Paris, France
Continuation of application Ser. No. 156,588, Dec. 4, 1961. This application Apr. 14, 1965, Ser. No. 450,243
Claims priority, application France, Dec. 15, 1960, 846,983, Patent 1,282,696
1 Claim. (Cl. 351—154)

This application is a continuation of copending application Serial No. 156,588, filed Dec. 4, 1961, now abandoned.

This invention relates to spectacles.

In spectacle making it has been known for a long time to secure the ophthalmic lenses to the frame by gluing.

If the lenses and the frame are of plastic material, it it easy to perform their assembly by using an appropriate solvent which superficially dissolves these members thereby making it possible to form an autogenous bond.

In the case in which there are no solvents common to the members which are to be assembled, for example if it is a question of securing glasses to a metal frame, one makes use either of a cement analogous to that utilized in dental prosthesis or of a glue, for example a self-polymerizing glue such as ethoxyline resin described by the commercial name of Araldite (registered trademark).

During the hardening of the cement or of the glue, it is necessary to keep the members in position by means of more or less complex assemblies. Cold setting is a long operation which renders the use of this process of little advantage commercially. This setting may be accelerated by heating, but this solution cannot be applied in the case of materials which do not withstand heat, for example lenses made of organic material.

According to the invention, there are provided spectacles comprising a spectacle frame, two ophthalmic lenses, and two strips of resilent material, each said strip having one face glued to a lens and its opposed face glued to the spectacle frame, and said strips each being of a resilient material which conforms under pressure to surface irregularities of areas of the lens and frame to which the strip is glued.

Further, in the invention provides spectacles comprising a spectacle frame including a frontal bar, two ophthalmic lenses, and two strips of resilent material, each said strip having one face glued to a lens and its opposed face glued to the frontal bar, and said strips each being of a resilient material which conforms under pressure to surface irregularities of areas of the lens and the frontal bar to which the strip is glued. The disadvantage of normal cold-setting glues can be avoided by use of a glue which adheres instantaneously, in particular of a glue having a cyano-acrylic monomer base, which possesses the essential property of very rapid cold polymerization.

For this last glue, the polymerization reaction in fact occurs as soon as the monomer is applied in the form of a very thin film, which in particular occurs when two surfaces between which a drop of this glue has been interposed as brought close to each other.

The invention further consists of interposing between the pieces which are to be joined a strip or blade made of a supple material such as a natural or synthetic rubber or an analogous material. Owing to its elasticity, this strip makes possible a perfect adjustment and contact between the members which are to be secured by compensating for the unevennesses of shape and surface of these latter. This adjustment and contact are in fact necessary in order to obtain a satisfactory polymerization of the glue and, dependent thereon, a bond of satisfactory quality.

A double glued joint is thus obtained, the lens and the frame being glued to either side of the supple strip.

For each of these glued joints, a film of glue which is very thin and of uniform thickness is formed, since the contact face of the supple strip adapts itself perfectly to the face of the corresponding member, irrespective of the irregularities of this latter, and the setting of this film then occurs in the best conditions and is very rapid. The remanent strains in the supple strip after bonding and relaxation of the applied pressure are easily borne by the material of this strip.

Among the materials from which said strip may be made, one may specify for example that natural or synthetic rubbers, cellulose acetate, cellulose butyrate, polystyrene, polyesters, as well as other synthetic products based on phenols, epoxy resins, acrylic resins, polyamides, urethane, and polyvinylic compounds.

The attachment by gluing according to the invention is particularly convenient for the mounting of organic lenses made of allyl carbonate 1.4 diethyleneglycol using the glue sold commercially under the name of Eastman 910, which has a cyano-acrylic monomer base.

Further, the invention comprehends a spectacle frame comprising a frontal bar, and two strips of resilient material, each said strip having one face glued to the frontal bar and its opposed face adapted to be glued to an ophthalmic lens, said strips each being of a resilient material which conforms under pressure to surface irregularities of areas of the frontal bar and the lens to which the strip is glued.

Figure 2:
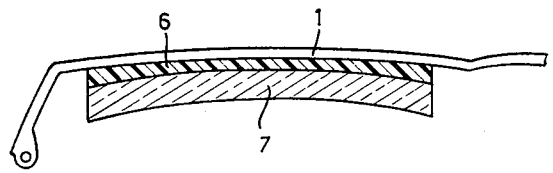

In order that the invention may be more clearly understood, some embodiments thereof will now be described by way of example, with reference to the accompanying drawings, in which:

FIGURE 1 is a view in section of a part of a spectacle frame according to the invention, showing the gluing of a lens into the frame, and FIGURE 2 is a horizontal section illustrating a modified embodiment of the invention.

Referring to the drawings, FIGURE 1 shows a frontal bar 1 of a spectacle frame of plastic, metal or composite material. Under the lower face of the bar 1 there is formed a groove 2 which is of U-shaped cross section having a flat bottom 3. This bar is made in such manner that its front edge 4 extends lower than its back edge 5.

A strip 6 of a supple material, for example of neoprene, is engaged in the groove 2 and is secured to the frame by being glued to the bottom 3 of this groove. An appropriate glue is used, for example, the glue known commercially under the name of Eastman 910, which has a cyano-acrylic monomer base. A thin layer of this glue is spread on the bottom 3 of the groove 2 before the insertion of the strip 6.

It is then sufficient to place the strip 6 into the groove 2 and to press it against the bottom 3 of the groove in order to form a film of glue which is thin and of uniform thickness over the entire surface of the bottom 3, which then causes the solidification of this glue. The resilience of the strip 6 ensures a satisfactory contact between the surfaces which are to be joined, irrespective of the state of the finish of the bottom of the groove, and it is this satisfactory contact which assures than an even film of glue is obtained, being the essential condition for a bond of high quality.

To mount an ophthalmic lens 7, is then sufficient to spread a thin layer of glue on the exposed face 8 of the strip 6 and/or on the upper rim of the lens 7, and to place this rim against the face 8 of the strip. The solidification of the glue and the attachment of the lens are obtained as previously, by bringing the members which are to be glued close to each other. Because of its resilience, the strip 6 adapts itself perfectly to the unevennesses which may be exhibited by the section of the lens 7, which again ensures an excellent bond.

Excellent results are attained for the mounting of glass lenses and of organic lenses, in particular of lenses made of "allyl carbonate 1.4 diethyleneglycol."

The resilient strip 6 distributes the stresses over the bond when tractive or torsional stresses are exerted on the assembly.

In the embodiment illustrated in FIGURE 1, the exposed face 8 of the strip 6 is disposed at an intermediary level between the level of the front rim 4 and back rim 5. In this way, the front rim covers the line of the bond, whereas the projection of the strip 6 relative to the back rim 5 permits a slight rearward tilt of the lens 7. A particularly resilient mounting is thus obtained.

It is naturally possible to hold in stock or supply the bar so equipped, the first gluing operation (strip 6 to bar 1) having already been performed, the lenses not being glued until later.

The strip 6 may be glued to one face of a bar without being engaged in a special cavity analogous to the groove 2. For example, as shown in FIGURE 2, the strip 6 may be glued between the back face of the frontal bar 1 and the front face of the lens 7, close to the upper rim of the lens.

The invention is not limited to embodiments described by way of example, but may form the object of numerous detail modifications, which modifications may in particular apply to the profile of the resilient strip and to the place at which said strip is glued to the frame.

Moreover, the present improvements are applicable to optical appliances such as pince-nez, clip-on lenses.

Having described my invention, I claim:

An optical device comprising a relatively rigid frame member having a frontal bar extending across the top of said member, a resilient strip which conforms under pressure when cold to the surface irregularities of said frontal bar, a first thin layer of cold-setting self-polymerizing cyano-acrylic monomer adhesive other than the material of the strip, said adhesive adhering instantly in a thin layer and being disposed between and adhesively bonding together the strip and said frontal bar, an ophthalmic lens, and a second thin layer of cold-setting self-polymerizing cyano-acrylic monomer adhesive other than the material of the strip adhering instantly in a thin layer and being disposed between and adhesively bonding together the strip and the upper edge portion of the ophthalmic lens, the length of said strip being longitudinally equal to the length of said upper edge portion, said frontal bar having a groove therein, said strip being disposed in said groove, the lens being concavo-convex, the side wall of the groove being substantially taller on the convex than on the concave side of the lens and overlying an edge of the lens, the side wall of the groove on the concave side of the lens terminating above said upper edge portion of the lens.

References Cited by the Examiner

UNITED STATES PATENTS

| 2,035,195 | 3/1936 | Scherer | 351—144 |
| 2,254,746 | 9/1941 | Line | 351—106 |
| 2,586,439 | 2/1952 | Royce | 351—154 X |
| 2,794,788 | 6/1957 | Coover et al. | |
| 2,909,204 | 10/1959 | Somerville | 88—57 X |

FOREIGN PATENTS

| 973,841 | 9/1950 | France. |
| 1,204,738 | 8/1959 | France. |

DAVID H. RUBIN, *Primary Examiner.*